(12) United States Patent
Yabuuchi et al.

(10) Patent No.: US 10,153,487 B2
(45) Date of Patent: Dec. 11, 2018

(54) LITHIUM COMPLEX OXIDE (71) Applicants: JX Nippon Mining & Metals Corporation, Tokyo (JP); Tokyo University Of Science Foundation, Tokyo (JP)

(72) Inventors: Naoaki Yabuuchi, Tokyo (JP); Shinichi Komaba, Tokyo (JP); Yoshio Kajiya, Tokyo (JP)

(73) Assignees: JX Nippon Mining & Metals Corporation, Tokyo (JP); Tokyo University Of Science Foundation, Tokyo (JP)

( * ) Notice: Subject to any disclaimer, the term of this patent is extended or adjusted under 35 U.S.C. 154(b) by 4 days.

(21) Appl. No.: 15/111,021

(22) PCT Filed: Feb. 25, 2015

(86) PCT No.: PCT/JP2015/055452
§ 371 (c)(1),
(2) Date: Jul. 12, 2016

(87) PCT Pub. No.: WO2015/133348
PCT Pub. Date: Sep. 11, 2015

(65) Prior Publication Data
US 2016/0344026 A1 Nov. 24, 2016

(30) Foreign Application Priority Data
Mar. 3, 2014 (JP) .................. 2014-040958

(51) Int. Cl.
*H01M 4/505* (2010.01)
*H01M 4/131* (2010.01)
*H01M 4/62* (2006.01)
*H01M 4/66* (2006.01)
*H01M 10/0525* (2010.01)
*H01M 4/485* (2010.01)
*H01M 4/525* (2010.01)
*C01G 53/00* (2006.01)
*C01G 45/12* (2006.01)
*H01M 4/04* (2006.01)
*H01M 4/1391* (2010.01)
*H01M 4/02* (2006.01)

(52) U.S. Cl.
CPC ........ *H01M 4/505* (2013.01); *C01G 45/1221* (2013.01); *C01G 45/1285* (2013.01); *C01G 53/42* (2013.01); *C01G 53/44* (2013.01); *H01M 4/131* (2013.01); *H01M 4/485* (2013.01); *H01M 4/525* (2013.01); *H01M 4/623* (2013.01); *H01M 4/625* (2013.01); *H01M 4/661* (2013.01); *H01M 10/0525* (2013.01); *C01P 2002/72* (2013.01); *C01P 2002/76* (2013.01); *C01P 2006/40* (2013.01); *H01M 4/043* (2013.01); *H01M 4/0404* (2013.01); *H01M 4/1391* (2013.01); *H01M 2004/028* (2013.01)

(58) Field of Classification Search
None
See application file for complete search history.

(56) References Cited

U.S. PATENT DOCUMENTS

| 6,346,348 B1 | 2/2002 | Nakajima et al. | |
|---|---|---|---|
| 2003/0129495 A1 | 7/2003 | Yamato et al. | |
| 2007/0054192 A1 | 3/2007 | Koga et al. | |
| 2010/0143803 A1 | 6/2010 | Park | |
| 2014/0099549 A1* | 4/2014 | Ceder | H01M 4/485 429/220 |
| 2016/0240848 A1* | 8/2016 | Asano | H01M 4/505 |

FOREIGN PATENT DOCUMENTS

| CN | 102306779 A | 1/2012 |
|---|---|---|
| EP | 1351327 A1 | 10/2003 |
| JP | 2526093 B2 | 8/1996 |
| JP | 2000-231920 A | 8/2000 |
| JP | 2010-47466 A | 3/2010 |
| JP | 2010-135325 A | 6/2010 |
| WO | 02/41419 A1 | 5/2002 |
| WO | 2014/055665 A2 | 4/2014 |

OTHER PUBLICATIONS

International Search Report dated May 19, 2015 in corresponding PCT application No. PCT/JP2015/055452.
International Preliminary Report on Patentability dated Sep. 9, 2016 in corresponding PCT application No. PCT/JP2015/055452.
European communication dated Jul. 26, 2017 in corresponding European patent application No. 15759084.5.
European communication dated Jun. 4, 2018 in corresponding European patent application No. 15759084.5.

* cited by examiner

*Primary Examiner* — Sin J Lee
(74) *Attorney, Agent, or Firm* — Nields, Lemack & Frame, LLC (57) ABSTRACT

Provided is a novel lithium complex oxide containing molybdenum. A complex oxide represented by the following compositional formula: $Li_xM_yMo_zO$ wherein M is one or two or more selected from the group consisting of Mn, Ru, Sn, Mg, Al, Ti, V, Cr, Fe, Co, Ni, Cu, and Zn; x is in the range of 0.60 to 0.75; y is in the range of 0.15 to 0.25; and z is in the range of 0.075 to 0.20.

15 Claims, 9 Drawing Sheets

(001); Li-Re LAYER

LITHIUM COMPLEX OXIDE

TECHNICAL FIELD

The present invention relates to a lithium complex oxide, particularly to a lithium complex oxide useful as a positive electrode active material for a non-aqueous electrolyte secondary battery exemplified by a lithium ion secondary battery.

BACKGROUND ART

Demands for lithium ion secondary batteries as batteries for use in consumer electronic equipment such as cellular phones and personal computers and electric vehicles have been rapidly increased, and a large market is prospected. The positive electrode of lithium ion batteries is typically manufactured by applying a positive electrode material prepared from a mixture of a positive electrode active material, an electricity-conducting material and a binder to a single side or both sides of a current collector such as an aluminum foil, followed by drying and pressing.

Examples of the typical conventional positive electrode active material for use in lithium ion secondary batteries include a complex oxide of lithium and a transition metal such as $LiCoO_2$, $LiNiO_2$, and $LiMnO_2$ having a layer structure and $LiMn_2O_4$ having a spinel structure. Various studies have been made to improve the characteristics required for a positive electrode active material such as the capacitance density, the charge and discharge cycle durability and the safety. From the viewpoint of achieving high capacity of lithium ion batteries, studies focusing on molybdenum have been recently performed in addition to the typical transition metals such as Co, Ni, and Mn.

According to the description in Japanese Patent Laid Open No. 2010-135325 (Patent Literature 1), cathode active materials of $Li_2MoO_3$ doped with various different elements achieve improved electrical characteristics and can be used in various secondary batteries such as lithium batteries. And disclosed are complex oxide compounds of $Li_2MoO_3$ with a part of molybdenum substituted with a different element M. Specifically, a positive electrode active material that contains a compound represented by $Li_xM_yMo_zO_3$ is disclosed, wherein x, y and z satisfy: $0.1 \leq x \leq 2.3$, $0 < y \leq 0.3$, and $0.7 \leq z \leq 1.1$; and M represents at least one selected from the group consisting of Ga, Ge, Mg, Zn, Cd, K, Na, Ca, Si, Cu, Sn, B, P, Se, Bi, As, Zr, Cr, Sr, Sc, Y, Ba, a rare earth element, and a mixture thereof.

In order to provide a positive electrode active material for a non-aqueous electrolyte secondary battery having higher capacity than that of current $LiCoO_2$, excellent in the thermal stability in a charged state, at a low cost, International Publication No. WO 2002/041419 (Patent Literature 2) discloses a positive electrode active material for a non-aqueous electrolyte secondary battery comprising a lithium complex oxide represented by the following compositional formula (1), the X-ray diffraction chart of the lithium complex oxide including diffraction peaks of a complex oxide of Li and W and/or a complex oxide of Li and Mo, in addition to the main diffraction peaks attributable to a hexagonal crystal structure:

$$Li_aNi_bCo_cMn_dM_eO_2 \qquad (1)$$

wherein M represents one or more selected from W and Mo, and $0.90 \leq a \leq 1.15$, $0 < b < 0.99$, $0 < c \leq 0.5$, $0 < d \leq 0.5$, $0 < c+d \leq 0.9$, $0.01 \leq e \leq 0.1$, and $b+c+d+e=1$.

According to the description in Japanese Patent No. 2526093 (Patent Literature 3), use of a lithium-molybdenum oxide represented by $Li_{2-x}MoO_3$ as the positive electrode active material for lithium secondary batteries allows the voltage to increase, and thereby lithium secondary batteries having a high energy density can be obtained, wherein x satisfies $0 < x \leq 1$, and 2-x indicates that $Li_2MoO_3$ is first synthesized, and Li is then electrochemically removed from the $Li_2MoO_3$.

CITATION LIST

Patent Literature

Patent Literature 1: Japanese Patent Laid Open No. 2010-135325

Patent Literature 2: International Publication No. WO 2002/041419

Patent Literature 3: Japanese Patent No. 2526093

SUMMARY OF INVENTION

Technical Problem

Several lithium complex oxide focused on Mo are thus known. Since Mo is capable of having an oxidation number of up to 6, various lithium complex oxides may be potentially formed. There exists a possibility of obtaining a novel lithium complex oxide usable as a positive electrode active material for a non-aqueous electrolyte secondary battery therefrom. Accordingly, one of the objects of the present invention is to provide a novel lithium complex oxide that contains molybdenum.

Solution to Problem

An aspect of the present invention provides a complex oxide represented by the following compositional formula:

$$Li_xM_yMo_zO$$

wherein M is one or two or more selected from the group consisting of Mn, Ru, Sn, Mg, Al, Ti, V, Cr, Fe, Co, Ni, Cu, and Zn, and x is in the range of 0.60 to 0.75, y is in the range of 0.15 to 0.25, and z is in the range of 0.075 to 0.20.

In an embodiment of the complex oxide of the present invention, the complex oxide has a rock-salt structure with ordering of a part of cations.

In another embodiment of the complex oxide of the present invention, the complex oxide has a $Li_5ReO_6$-type crystal structure, with Re sites substituted with Mo or M, and a part of Li sites substituted with M.

In yet another embodiment of the complex oxide of the present invention, the complex oxide has a $Li_4MoO_5$-type crystal structure, with a part of Mo sites substituted with M, and a part of Li sites substituted with M.

In yet another embodiment of the complex oxide of the present invention, the complex oxide has a $Li_2MnO_3$-type crystal structure, with Mn sites substituted with Mo or M, and a part of Li sites substituted with M.

In yet another embodiment of the complex oxide of the present invention, the complex oxide satisfies: $x+y+z=0.95$ to 1.05.

In yet another embodiment of the complex oxide of the present invention, M is one or two or more selected from the group consisting of Ni, Mn, Fe, and Co.

Another aspect of the present invention provides a positive electrode for a non-aqueous electrolyte secondary battery, comprising the complex oxide of the present invention as the positive electrode active material.

Yet another aspect of the present invention provides a non-aqueous electrolyte secondary battery comprising the positive electrode of the present invention.

Advantageous Effects of Invention

According to the invention, a novel molybdenum-containing lithium complex oxide useful as a positive electrode active material for a non-aqueous electrolyte secondary battery can be provided. In the present invention, in particular, being doped with a metal element M for substitution at a predetermined ratio, a lithium complex oxide with more improved charge and discharge characteristics than those of $Li_4MoO_5$ can be obtained.

DESCRIPTION OF EMBODIMENTS (Composition)

The complex oxide of the present invention is generally represented by the following compositional formula:

wherein M is one or two or more selected from the group consisting of Mn, Ru, Sn, Mg, Al, Ti, V, Cr, Fe, Co, Ni, Cu, and Zn, and x is in the range of 0.60 to 0.75, y is in the range of 0.15 to 0.25, and z is in the range of 0.075 to 0.20.

In an embodiment, the complex oxide of the present invention satisfies: x+y+z=0.95 to 1.05, more preferably x+y+z=1. From the viewpoint of obtaining a rock-salt type crystal structure, x+y+z is required to be in the range. Although x+y+z=1 is ideal in obtaining a rock-salt type single-phase crystal, the rock-salt type crystal structure can be obtained even with a value of x+y+z of less than 1, in the range down to approximately 0.95, resulting from a deficient amount of cations or an excessive amount of oxygen. To the contrary, the rock-salt type crystal structure can be obtained even with a value of x+y+z of more than 1, in the range up to approximately 1.05.

The complex oxide basically has a composition of lithium molybdate ($Li_{4/5}Mo_{1/5}O$) with a part of lithium or molybdenum substituted with another metal element M. The metal elements described above are selected as M, for reasons such as battery capacity, safety, and structural stability. In particular, for the reason of manifestation of the capacity, the M for use is preferably one or two or more selected from the group consisting of Ni, Mn, Fe, and Co, more preferably any one or two selected from the group consisting of Ni and Mn.

Although the complex oxide contains impurities other than the intended elements in some cases, the impurities in a total content of 1000 ppm by mass or less have almost no effect on the characteristics. Accordingly, the complex oxide that contains such a trace amount of impurities is within the scope of the present invention.

In the formula, x represents a proportion of Li in the metal elements. On the basis of lithium molybdate ($Li_{4/5}Mo_{1/5}O$), it can be evaluated that x represents the degree of substitution of Li with M. As the degree of substitution with M increases, x decreases. With x of less than 0.60, the battery capacity tends to decrease due to reduction in the amount of movable Li, while with x of more than 0.75, the electronic conductivity tends to decrease due to reduction in the amount of M. Accordingly, x is in the range of 0.60 to 0.75. The control of x can be performed through the adjustment of the amount of lithium sources in manufacturing of the complex oxides.

In the formula, y represents the proportion of M in the metal elements. On the basis of lithium molybdate ($Li_{4/5}Mo_{1/5}O$), it is indicated that as the amount of M increases, the degree of substitution of Li or Mo with M increases. With y of less than 0.15, the electronic conductivity tends to decrease due to reduction in the amount of substitution for Li or Mo, while with y of more than 0.25, single crystals including no phase of impurities are unlikely to be obtained. Accordingly, y is in the range of 0.15 to 0.25. The control of y can be performed through the adjustment of the amount of M sources in manufacturing of the complex oxides.

In the formula, z represents the proportion of Mo in the metal elements. On the basis of lithium molybdate ($Li_{4/5}Mo_{1/5}O$), it can be evaluated that z represents the degree of substitution of Mo with M. As the degree of substitution with M increases, z decreases. With z of less than 0.075, the effect of the substitution on the increase in capacity is low, while with z of more than 0.20, the electronic conductivity tends to decrease. Accordingly, z is in the range of 0.075 to 0.20. The control of z can be performed through the adjustment of the amount of Mo sources in manufacturing of the complex oxides.

In an embodiment of the complex oxide of the present invention, the average valence of Mo is 5.7 to 6.0. The valence of Mo in lithium molybdate ($Li_{4/5}Mo_{1/5}O$) is 6, corresponding to the maximum valence which Mo can take. In lithium molybdate, Mo is, therefore, not oxidized any more, causing the problem of difficulty in charge and discharge when used as the positive electrode active material for secondary batteries.

In the case of using the complex oxide of the present invention with an average valence of Mo set to approximately 6 as the positive electrode active material, it is therefore conceivable that sufficient charge/discharge characteristics may not be obtained. However, the substitution with a substituent metal element M greatly increases the charge/discharge capacity of lithium molybdate. It is conceivable that the increase is due to the following reasons, though the theory is not intended to limit the invention. The first reason is that the charge/discharge is performed by oxidation/reduction of the substituent metal. The second reason is that the improved conductivity due to the presence of the substituent metal enables the charge/discharge to be performed by oxidation/reduction of oxygen, which is unlikely to occur for the case of Mo alone. In the present invention, the average valence of Mo is measured by X-ray photoelectron spectroscopy.

In the present invention, the composition is determined by quantitative analysis of each of the elements (Li, Ni, Mo, etc.) of the material using ICP (ICP spectrometer).

(Crystal Structure)

In an embodiment, the complex oxide of the present invention has a rock-salt structure with ordering of a part of cations in which the mother structure is composed of oxide ions. The rock-salt structure of the complex oxide of the present invention may be a $Li_5ReO_6$-type, a $Li_4MoO_5$-type or a $Li_2MnO_3$-type. Although the mechanism to determine the crystal structure is not clear, any one of the crystal structures is selected depending on the substituent metal.

Figure 9:
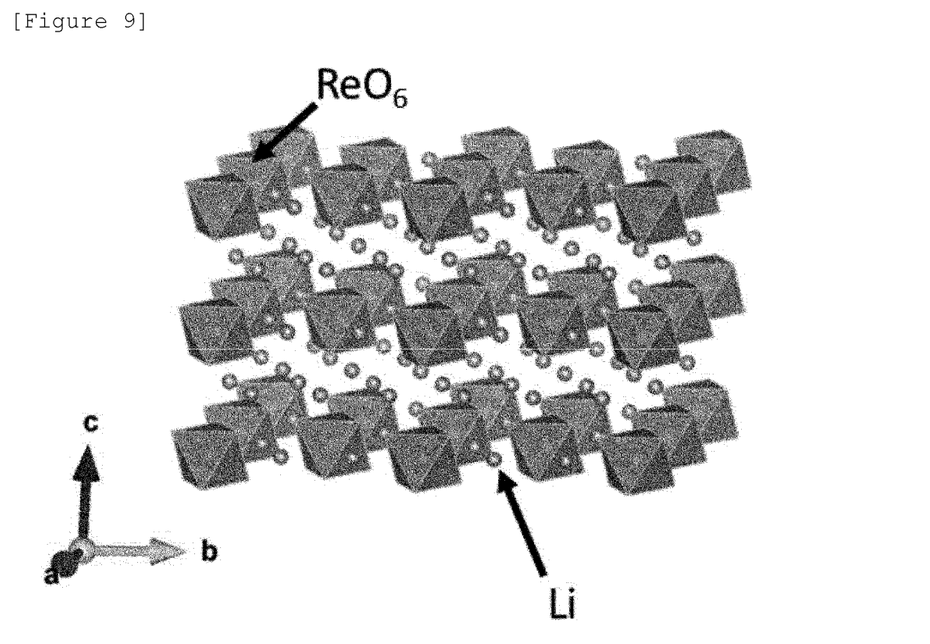
FIG. 9 is a schematic view showing the crystal structure of $Li_5ReO_6$.
Figure 10:
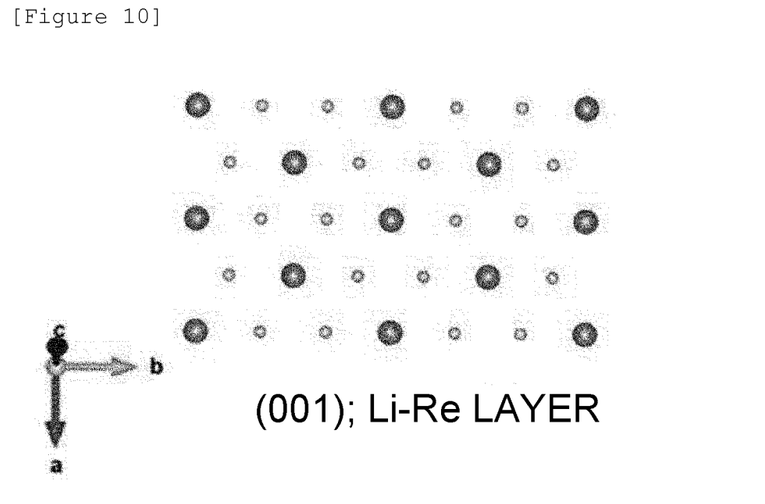
FIG. 10 is a schematic view showing a state in which Li and Re are in an ordered arrangement at the (111) plane of the rock-salt structure of $Li_5ReO_6$.

In an embodiment, the complex oxide of the present invention has a $Li_5ReO_6$-type crystal structure with Re sites substituted with Mo or M, and with a part of Li sites substituted with M. It is known that the crystal structure of $Li_5ReO_6$ belongs to a space group c2/m (monoclinic system) as shown in FIG. 9, with lattice constants: a=5.06796 Å, b=8.73158 Å, c=5.02936 Å (T. Betz, R. Hoppe, Z. Anorg. Allg. Chem. 512. 19-33 (1984)). $Li_5ReO_6$ has a structure including the same oxygen skeleton as in the rock-salt structure, with Re and Li in an ordered arrangement at a ratio of 1:5 in the 6-coordinated octahedral sites. The crystal structure of $Li_5ReO_6$ as a rock-salt structure has two (001) planes, with a layered structure including a layer of Li without Re and a layer of Re and Li in an ordered arrangement at an atomic ratio of 1:2 in parallel with the (001) plane (refer to FIG. 10). In the present invention, the term "$Li_5ReO_6$-type crystal structure" indicates a structure in coincidence with the crystal framework, regardless of the lattice constant.

Figure 11:
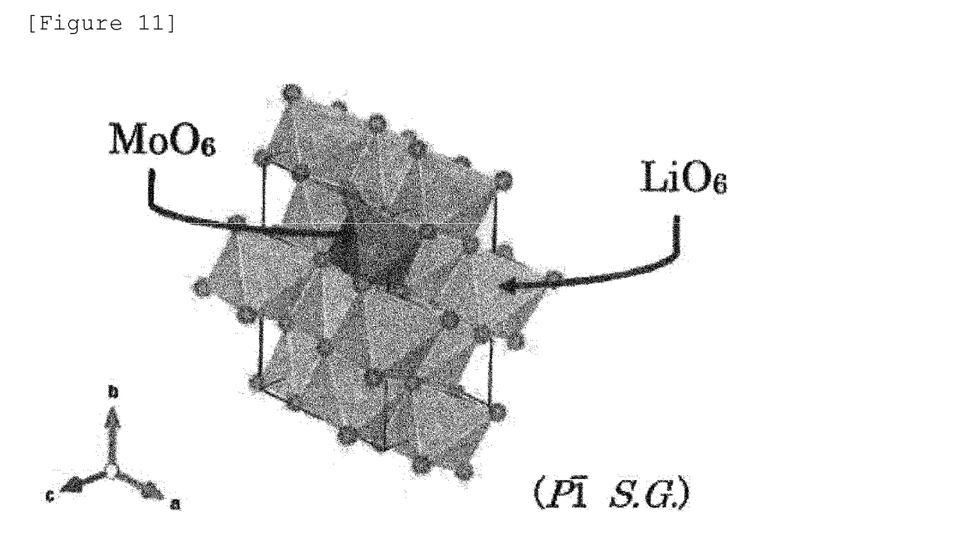
FIG. 11 is a schematic view showing the crystal structure of $Li_4MoO_5$.

In an embodiment, the complex oxide of the present invention has a $Li_4MoO_5$-type crystal structure with a part of Mo sites substituted with M, and with a part of Li sites substituted with M. It is known that the crystal structure of $Li_4MoO_5$ belongs to a space group P-1 as shown in FIG. 11, with lattice constants: a=5.119 Å, b=7.727 Å, c=5.064 Å (T. Betz, R. Hoppe, Z. Anorg. Allg. Chem. 573. 157-169 (1989)). In the present invention, the term "$Li_4MoO_5$-type crystal structure" indicates a structure in coincidence with the crystal framework, regardless of the lattice constant.

Figure 14:
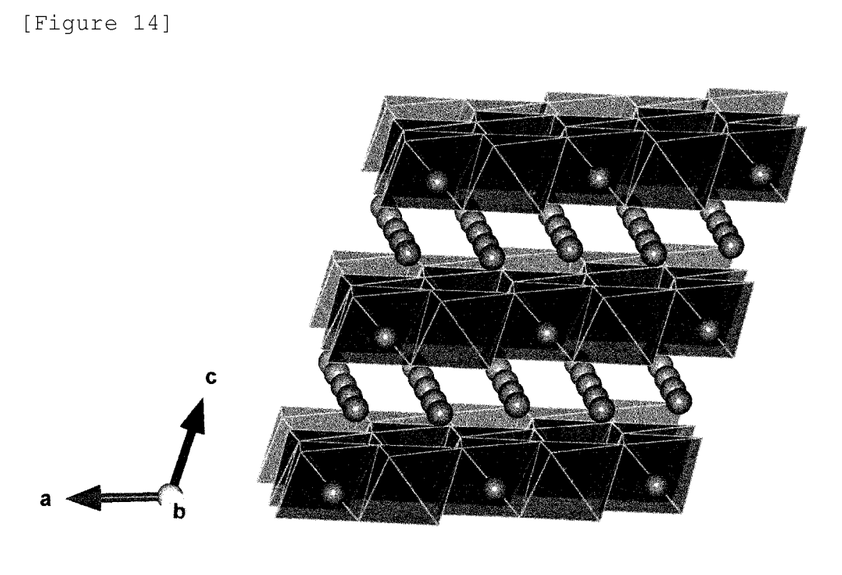
FIG. 14 is a schematic view showing the crystal structure of $Li_2MnO_3$.

In an embodiment, the complex oxide of the present invention has a $Li_2MnO_3$-type crystal structure with Mn sites substituted with M or Mo. It is known that the crystal structure of $Li_2MnO_3$ belongs to a space group C2/m as shown in FIG. 14, with lattice constants: a=4.937 Å, b=8.532 Å, c=5.032 Å, and beta=109.46 deg (P. STROBEL AND B. LAMBERT-ANDRON, JOURNAL OF SOLID STATE CHEMISTRY 75, 90-98 (1988)). In the present invention, the term "$Li_2MnO_3$-type crystal structure" includes a structure in coincidence with the crystal framework, regardless of the lattice constant.

(Manufacturing Method)

The method for manufacturing a complex oxide of the present invention is described as follows. In an embodiment of the method for manufacturing a complex oxide of the present invention, comprises the steps of: preparing a mixture including a lithium compound, a hexavalent molybdenum compound, and a compound of one or two or more metals selected from the group consisting of Mn, Ru, Sn, Mg, Al, Ti, V, Cr, Fe, Co, Ni, Cu, and Zn at a target metal composition ratio; and firing the mixture.

Examples of the lithium compound include, but are not limited to, lithium carbonate, lithium hydroxide, lithium oxide, lithium chloride, lithium nitrate, lithium sulfate, lithium hydrogen carbonate, lithium acetate, lithium fluoride, lithium bromide, lithium iodide, and lithium peroxide. In particular, lithium carbonate and lithium hydroxide are preferred due to high solubility.

The hexavalent molybdenum compound is used due to high solubility. Examples thereof include, but are not limited to, molybdenum trioxide ($MoO_3$).

In the case of using nickel as the metal element M, examples of the manganese compound include, but are not limited to, metallic nickel, nickel oxide, nickel hydroxide, nickel nitrate, nickel carbonate, nickel chloride, nickel iodide, and nickel sulfate.

In the case of using manganese as metallic element M, examples of the manganese compound include, but are not limited to, metallic manganese, manganese oxide, manganese hydroxide, manganese nitrate, manganese carbonate, manganese chloride, manganese iodide, and manganese sulfate.

In the case of using cobalt as metallic element M, examples of the cobalt compound include, but are not limited to, metallic cobalt, cobalt oxide, cobalt hydroxide, cobalt nitrate, cobalt carbonate, cobalt chloride, cobalt iodide, and cobalt sulfate.

In the case of using other metals, i.e., Ru, Sn, Mg, Al, Ti, V, Cr, Fe, Cu or Zn, as metal element M, the carbonates, nitrates, hydroxides, chlorides, oxides, etc., thereof may be used in the same way.

The mixing method is described as follows. Examples of the mixing method include, but are not limited to, a method of directly mixing powdery raw materials in a mortar or the like and a method of stirring and mixing raw materials dissolved or suspended in water and/or an organic solvent. The latter method is preferred as more uniform mixing can be achieved.

A preferred example of the latter method is as follows. First, an aqueous solution of lithium hydroxide is prepared using pure water. The appropriate concentration of lithium hydroxide in the aqueous solution is approximately 5 to 120 g/L, depending on the amount to be mixed. Subsequently, desired amounts of metal compound powder of molybdenum, nickel, cobalt, etc., are fed into the aqueous solution of lithium hydroxide so as to be stirred and mixed.

After evaporation of moisture from the resulting aqueous solution or the aqueous dispersion of the raw material mixture, an oxidation treatment (firing in an oxidizing atmosphere or the like) is performed under proper conditions to thereby obtain a complex oxide of the present invention. Molding into a desired shape may be performed prior to the oxidation treatment. In the preferred oxidation treatment, heating is performed such that the material temperature is held at 800 to 1100° C. At a temperature lower than 800° C., Li and other metals are not homogenized, while at a temperature higher than 1100° C., lithium defects increase, resulting in characteristic degradation such as capacity reduction. The holding time at the holding temperature is preferably 0.5 to 20 hours. The reasons are that with an excessively short holding time, Li and other metals are not homogenized, while with an excessively long holding time, the specific surface area decreases or lithium defects increase, resulting in characteristic degradation such as capacity reduction.

Cooling is then performed, while the continuous flow of an oxygen-containing gas such as air and oxygen is preferably maintained during the period from the initiation of heating the raw material mixture, through firing, until cooling to room temperature. The reason is to prevent oxygen defects and reduction in the oxidation number of molybdenum during the oxidation treatment.

The resulting complex oxide can be used as a positive electrode active material for a non-aqueous electrolyte secondary battery such as a lithium ion battery. In accordance with known means, a positive electrode for a non-aqueous electrolyte secondary battery can be manufactured. For example, a positive electrode mixture is prepared by mixing powder of the positive electrode active material of the present invention with a binder such as polyvinylidene fluoride, polytetrafluoroethylene, and a polyamide acrylic resin, and a conducting material such as acetylene black and graphite.

In preparation of a positive electrode mixture, it is important to uniformly mix the respective raw materials from the viewpoint of the manifestation of a battery capacity. The mixing method is not particularly limited, and a multiaxial dispersion kneader, a planetary kneader, a ball mill, etc., can be used.

Subsequently, the slurry of the positive electrode mixture is applied to a current collector such as aluminum foil, and pressed to make a positive electrode. Furthermore, by using the positive electrode of the present invention, a non-aqueous electrolyte secondary battery, in particular a lithium ion secondary battery, can be manufactured in accordance with a conventional method.

EXAMPLES

Hereinafter, Examples are provided for a better understanding of the present invention and the advantages thereof, though the present invention is not limited to these Examples.

Comparative Example 1: $Li_4MoO_5$ (Synthesis)

In a mortar, 3.43 g of $LiOH \cdot H_2O$ powder (3% excess in weight) and 2.83 g of molybdenum oxide ($MoO_3$) powder were mixed, and the mixture was molded into a pellet, which was then fired by being raised to 1050° C. and held thereat for 2 hours in a small furnace under air flow.

(Composition)

Each content of the elements in the resulting complex oxide was determined by ICP (SPS3520UV manufactured by SII Nano Technology Inc.), and the complex oxide was confirmed to be $Li_4MoO_5$. Furthermore, the average valence of molybdenum was confirmed to be 6 by the X-ray photoelectron spectroscopy measurement (5600MC manufactured by ULVAC-PHI Inc.) under the following conditions (the same as in the following Test Examples).

Ultimate vacuum: in the order of $10^{-7}$ Pa
Excitation source: monochromatized AlKa
Output: 210 W
Detection area: 800-μm diameter
Incident angle: 45 degrees
Take-off angle: 45 degrees
Neutralizing gun: used on an as needed basis
Sputtering conditions: ion species: $Ar^+$,
acceleration voltage: 1 to 3 kV (Crystal Structure)

Figure 7:
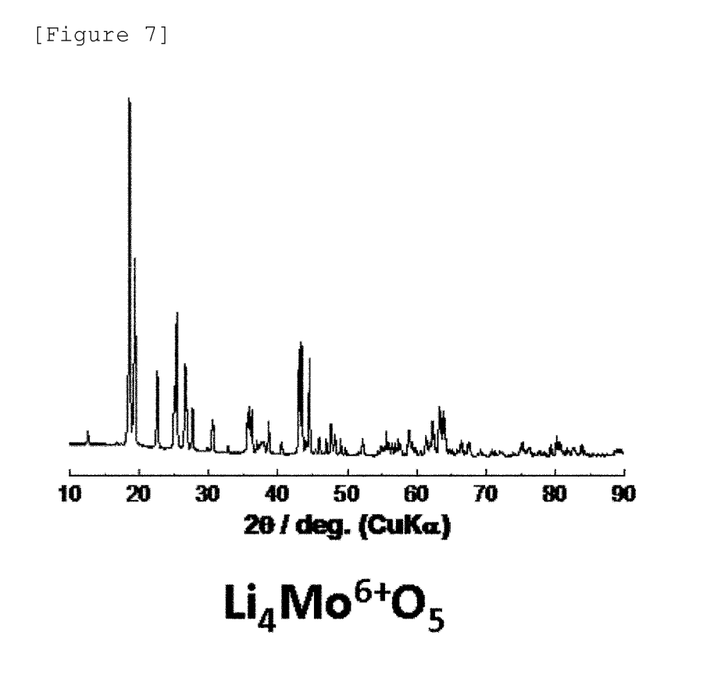
FIG. 7 is an XRD spectrum of the complex oxide in Comparative Example 1 ($Li_4MoO_5$).

Using an X-ray diffractometer (MultiFlex, manufactured by Rigaku Corporation) (CuKα radiation) equipped with a high-speed one-dimensional detector (D/teX Ultra, manufactured by Rigaku Corporation), the XRD spectrum of the resulting complex oxide was analyzed under the conditions with an output of 40 kV at 20 mA, a scanning speed of 8°/min, and a sampling width of 0.02°. The results are shown in FIG. 7. Since the results agreed with the XRD results described in literature (R. Hoppe et al., Z. Anorg. Allg Chem 573 (1989) 157 to 169), it is believed that the complex oxide has a P-1 crystal structure.

(Battery Evaluation)

The positive electrode active material (the complex oxide synthesized as described above) and acetylene black (manufactured by Wako Pure Chemical Industries, Ltd.) were weighed at a mass ratio of 80:20, and mixed for 24 hours in a dry ball mill (600 rpm). Subsequently, the mixture of the positive electrode active material and acetylene black described above was added to a binder (PVDF resin, manufactured by Polysciences, Inc.) dissolved in an organic solvent (N-methylpyrrolidone), at a mass ratio of (positive electrode active material):(acetylene black):(binder)=72:18:10, to make a slurry. The slurry was applied onto an Al foil, dried, and then pressed to make a positive electrode.

Figure 8:
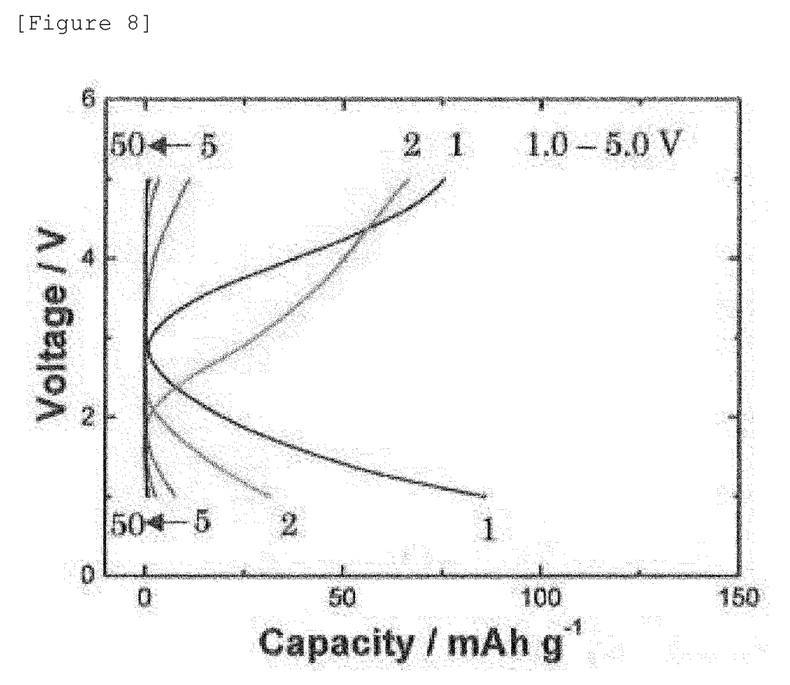
FIG. 8 is a chart showing charge/discharge curves in a charge/discharge test of an electrochemical cell prepared using the complex oxide in Comparative Example 1 as a positive electrode active material.

Subsequently, an electrochemical cell with a counter electrode of Li foil was prepared for evaluation. Using 1 M-$LiPF_6$ dissolved in EC/DMC (volume ratio of 1:1) as an electrolytic solution, a charge/discharge test was performed at a current density of 10 mA/g. The charge/discharge test was performed at room temperature, in the range of 1.0 to 5.0 V. The results are shown in FIG. 8. The capacity was less than 100 mAh/g even in the first cycle, and reached zero after repeating several cycles. This shows that $Li_4MoO_5$ itself is unlikely to manifest a capacity for practical use.

Example 1: $Li_{4/6}Ni_{1/6}Mo_{1/6}O$ (Synthesis)

In 60 mL of ion-exchanged water, 0.6700 g of $LiOH \cdot H_2O$ (3% excess in weight) was dissolved to prepare 60 mL of an aqueous solution of lithium hydroxide with a concentration of 0.2661 mol/L. Subsequently, 0.5176 g of molybdenum oxide ($MoO_3$) powder was dissolved in the aqueous solution of lithium hydroxide, and 0.4665 g of basic nickel carbonate powder was added thereto, to prepare a suspension with an excess of Li of 3% in weight ratio relative to the molar ratio of Li:Ni:Mo=4:1:1. The suspension was stirred with a hot stirrer, and the moisture was then evaporated.

The resulting sample was powdered in a mortar, and the powder was molded into a pellet, which was then fired by being raised to 1050° C. and held thereat in a small furnace for 2 hours under air flow.

(Composition)

Each content of the elements in the resulting complex oxide was determined by ICP (SPS3520UV manufactured by SII Nano Technology Inc.), and it was confirmed that the complex oxide has a composition (x, y, z)=(4/6, 1/6, 1/6). Further, the average valence of molybdenum was confirmed to be 6 by the X-ray photoelectron spectroscopy measurement.

(Crystal Structure)

Figure 1:
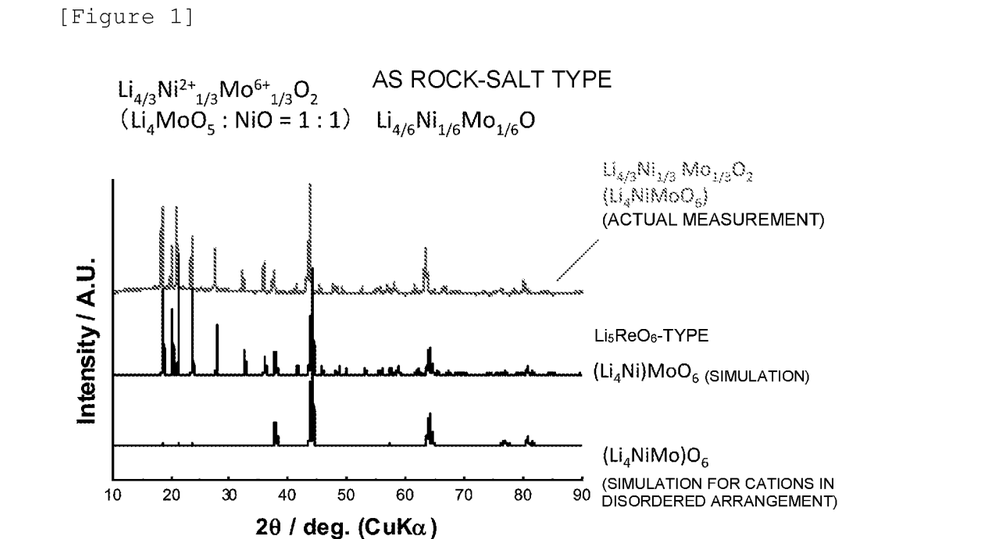
FIG. 1 is a comparative chart of the XRD spectra of the complex oxide in Example 1 ($Li_{4/6}Ni_{1/6}Mo_{1/6}O$) and $Li_5ReO_6$ (simulation).

Using an X-ray diffractometer (MultiFlex, manufactured by Rigaku Corporation) (CuKα radiation), the XRD spectrum of the resulting complex oxide was analyzed under the conditions with an output of 40 kV at 20 mA, a scanning speed of 8°/min, and a sampling width of 0.02°. The results are shown in FIG. 1. In addition, the XRD spectrum of $Li_5ReO_6$-type $Li_{4/3}Ni_{1/3}Mo_{1/3}O_2$ (simulation) cited from T. Betz, R. Hoppe, Z. Anorg. Allg. Chem. 512. 19-33 (1984) is also shown in FIG. 1. Although impurities are found in some parts, main peaks are coincident. It is believed that the complex oxide has a crystal structure of $Li_5ReO_6$, with $Re^{7+}$ sites substituted with $Mo^{6+}$ and a part of $Li^+$ sites substituted with $Ni^{2+}$. It can be, therefore, said that the complex oxide has a rock-salt structure with ordering of a part of the cations.

(Battery Evaluation)

The positive electrode active material (the complex oxide synthesized as described above) and acetylene black (manufactured by Wako Pure Chemical Industries, Ltd.) were weighed at a mass ratio of 80:20, and mixed for 24 hours in a dry ball mill (600 rpm). Subsequently, the mixture of the positive electrode active material and acetylene black described above was added to a binder (PVDF resin, manufactured by Polysciences, Inc.) dissolved in an organic solvent (N-methylpyrrolidone), at a mass ratio of (positive electrode active material):(acetylene black):(binder)=72:18:10, to make a slurry. The slurry was applied onto an Al foil, dried, and then pressed to make a positive electrode.

Figure 2:
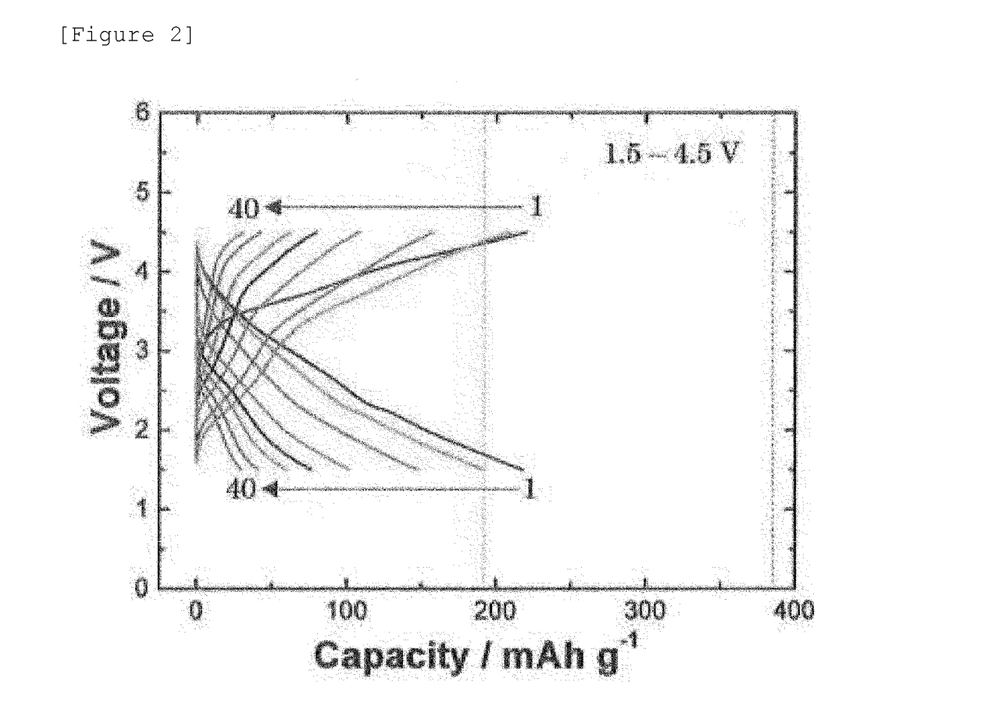
FIG. 2 is a chart showing charge/discharge curves in a charge/discharge test of an electrochemical cell prepared using the complex oxide in Example 1 as a positive electrode active material.

Subsequently, an electrochemical cell with a counter electrode of Li foil was prepared for evaluation. Using 1 $M-LiPF_6$ dissolved in EC/DMC (volume ratio of 1:1) as an electrolytic solution, a charge/discharge test was performed at a current density of 10 mA/g. The charge/discharge test was performed at room temperature, in the range of 1.5 to 4.5 V. The results are shown in FIG. 2. It is shown that until the second cycle the capacity exceeded the theoretical capacity of $Ni^{2+}/Ni^{4+}$ (193 mAh/g). This suggests that O (oxygen) contributed to the oxidation/reduction. Further, even after 10 cycles, a capacity of 100 mAh/g or more was shown in both of charging and discharging. Furthermore, it is shown that the polarization between charge and discharge is small, from the fact that the voltage difference between the charge curve and the discharge curve was small.

Example 2: $Li_{22/30}Mn_{5/30}Mo_{3/30}O$ (Synthesis)

In 60 mL of ion-exchanged water, 0.8037 g of $LiOH \cdot H_2O$ (3% excess in weight) was dissolved to prepare 60 mL of an aqueous solution of lithium hydroxide with a concentration of 0.3192 mol/L. Subsequently, 0.3617 g of molybdenum oxide ($MoO_3$) powder was dissolved in the aqueous solution of lithium hydroxide, and 0.5175 g of manganese carbonate ($MnCO_3$) powder was added thereto, to prepare a suspension with an excess of Li of 3% in weight ratio relative to the molar ratio of Li:Mn:Mo=22:5:3. The suspension was stirred with a hot stirrer, and the moisture was then evaporated.

The resulting sample was powdered in a mortar, and the powder was molded into a pellet, which was then fired by being raised to 1050° C. and held thereat for 2 hours in a small furnace under air flow.

(Composition)

Each content of the elements in the resulting complex oxide was determined by ICP (SPS3520UV manufactured by SII Nano Technology Inc.), and it was confirmed that the complex oxide has a composition (x, y, z)=(22/30, 5/30, 3/30). Further, the average valence of molybdenum was confirmed to be 6 by the X-ray photoelectron spectroscopy measurement.

(Crystal Structure)

Figure 3:
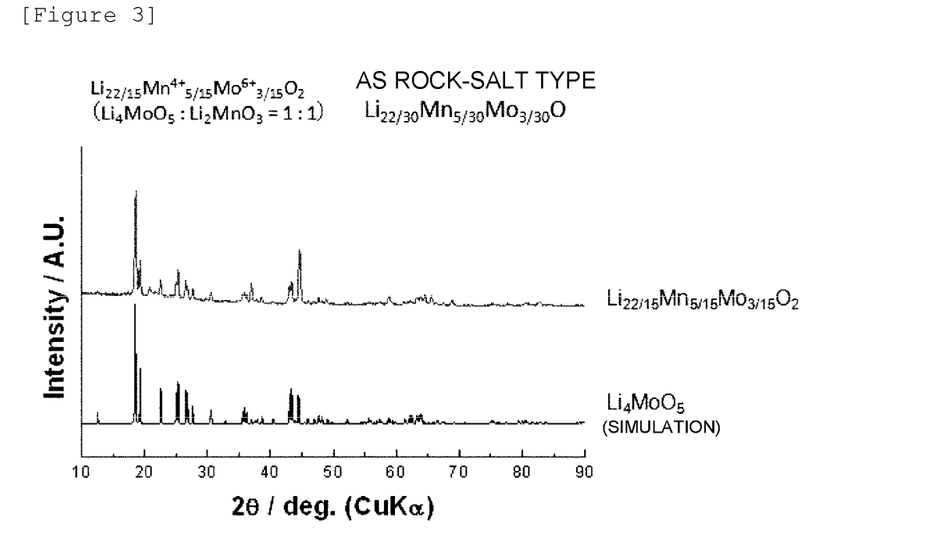
FIG. 3 is a comparative chart of the XRD spectra of the complex oxide in Example 2 ($Li_{22/30}Mn_{5/30}Mo_{3/30}O$) and $Li_4MoO_5$ (simulation).

Using an X-ray diffractometer (MultiFlex, manufactured by Rigaku Corporation) (CuKα radiation), the XRD spectrum of the resulting complex oxide was analyzed under the conditions with an output of 40 kV at 20 mA, a scanning speed of 8°/min, and a sampling width of 0.02°. The results are shown in FIG. 3. In addition, the XRD spectrum of $Li_4MoO_5$ (simulation) cited from T. Betz and R. Hoppe, Z. Anorg. Allg. Chem., 1984, 512, 19 is also shown in FIG. 3. Although impurities are found in some parts, main peaks are coincident. It is believed that the complex oxide has a crystal structure of $Li_4MoO_5$, with a part of Li sites and a part of Mo sites substituted with Mn. Accordingly, it can also be said that the complex oxide has a rock-salt structure with ordering of a part of the cations.

(Battery Evaluation)

The positive electrode active material (the complex oxide synthesized as described above) and acetylene black (manufactured by Wako Pure Chemical Industries, Ltd.) were weighed at a mass ratio of 80:20, and mixed for 12 hours in a dry ball mill (200 rpm). Subsequently, the mixture of the positive electrode active material and acetylene black described above was added to a binder (PVDF resin, manufactured by Polysciences, Inc.) dissolved in an organic solvent (N-methylpyrrolidone), at a mass ratio of (positive electrode active material):(acetylene black):(binder)=72:18:10, to make a slurry. The slurry was applied onto an Al foil, dried, and then pressed to make a positive electrode.

Figure 4:
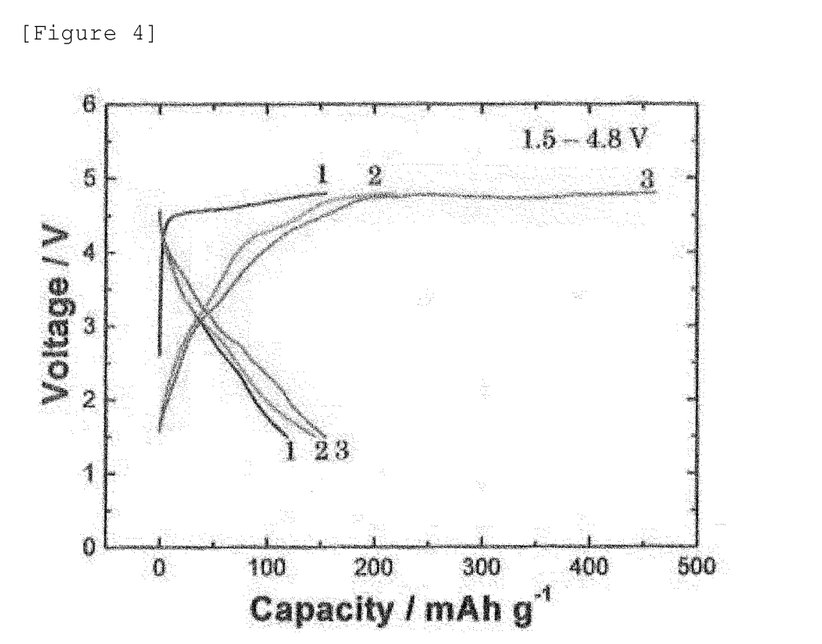
FIG. 4 is a chart showing charge/discharge curves in a charge/discharge test of an electrochemical cell prepared using the complex oxide in Example 2 as a positive electrode active material.

Subsequently, an electrochemical cell with a counter electrode of Li foil was prepared for evaluation. Using 1 $M-LiPF_6$ dissolved in EC/DMC (volume ratio of 1:1) as an electrolytic solution, a charge/discharge test was performed at a current density of 10 mA/g. The charge/discharge test was performed at room temperature, in the range of 1.5 to 4.8 V. The results are shown in FIG. 4. The charging capacity in the third cycle rose to 460 mAh/g, which was higher than the initial charging capacity.

Example 3: $Li_{42/60}Ni_{5/60}Mn_{5/60}Mo_{8/60}O$ (Synthesis)

In 60 mL of ion-exchanged water, 0.7088 g of $LiOH \cdot H_2O$ (3% excess in weight) was dissolved to prepare 60 mL of an aqueous solution of lithium hydroxide with a concentration of 0.2815 mol/L. Subsequently, 0.4455 g of molybdenum oxide ($MoO_3$) powder was added to the aqueous solution of lithium hydroxide, and 0.2391 g of manganese carbonate ($MnCO_3$) powder and 0.2510 g of basic nickel carbonate were further added thereto, to prepare a suspension with an excess of Li of 3% in weight ratio relative to the molar ratio of Li:Ni:Mn:Mo=42:5:5:8. The suspension was stirred with a hot stirrer, and the moisture was then evaporated to dryness.

The resulting sample was powdered in a mortar, and the powder was molded into a pellet, which was then fired by being raised to 1050° C. and held thereat for 2 hours in a small furnace under air flow.

(Composition)

Each content of the elements in the resulting complex oxide was determined by ICP-MS (SPQ-9100 manufactured by SII Nano Technology Inc.), and it was confirmed that the complex oxide has a composition (x, y, z)=($42/60$, $10/60$, $8/60$). Further, the average valence of molybdenum was confirmed to be 6 by the X-ray photoelectron spectroscopy measurement.

(Crystal Structure)

Figure 5:
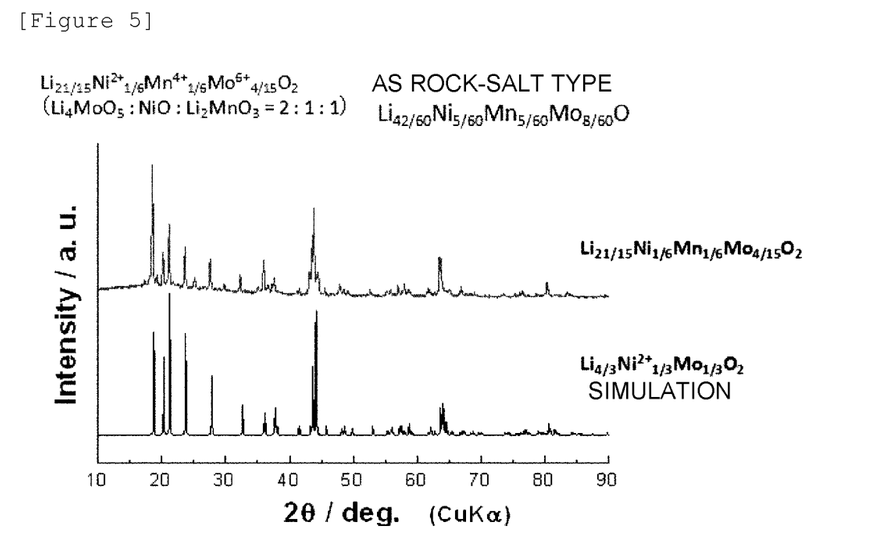
FIG. 5 is a comparative chart of the XRD spectra of the complex oxide in Example 3 ($Li_{42/60}Ni_{5/60}Mn_{5/60}Mo_{8/60}O$) and $Li_{4/3}Ni_{1/3}Mo_{1/3}O_2$ (Simulation).

Using an X-ray diffractometer (MultiFlex, manufactured by Rigaku Corporation) (CuKα radiation), the XRD spectrum of the resulting complex oxide was analyzed under the conditions with an output of 40 kV at 20 mA, a scanning speed of 8°/min, and a sampling width of 0.02°. The results are shown in FIG. 5. In addition, the XRD spectrum of $Li_5ReO_6$-type $Li_{4/3}Ni_{1/3}Mo_{1/3}O_2$ (simulation) cited from T. Betz and R. Hoppe, Z. Anorg. Allg. Chem., 1984, 512, 19, is also shown in FIG. 5. It is believed that the complex oxide has a crystal structure of $Li_5ReO_6$, with $Re^{7+}$ sites substituted with $Mo^{6+}$ and $Li^+$ sites substituted with Ni. Accordingly, it can also be said that the complex oxide has a rock-salt structure with ordering of a part of the cations. Further, Mn may substitute for both of the $Li^+$ sites and the $Re^{7+}$ sites.

(Battery Evaluation)

The positive electrode active material (the complex oxide synthesized as described above) and acetylene black (manufactured by Wako Pure Chemical Industries, Ltd.) were weighed at a mass ratio of 80:20, and mixed for 12 hours in a dry ball mill (200 rpm). Subsequently, the mixture of the positive electrode active material and acetylene black described above was added to a binder (PVDF resin, manufactured by Polysciences, Inc.) dissolved in an organic solvent (N-methylpyrrolidone), at a mass ratio of (positive electrode active material):(acetylene black):(binder)=72:18:10, to make a slurry. The slurry was applied onto an Al foil, dried, and then pressed to make a positive electrode.

Figure 6:
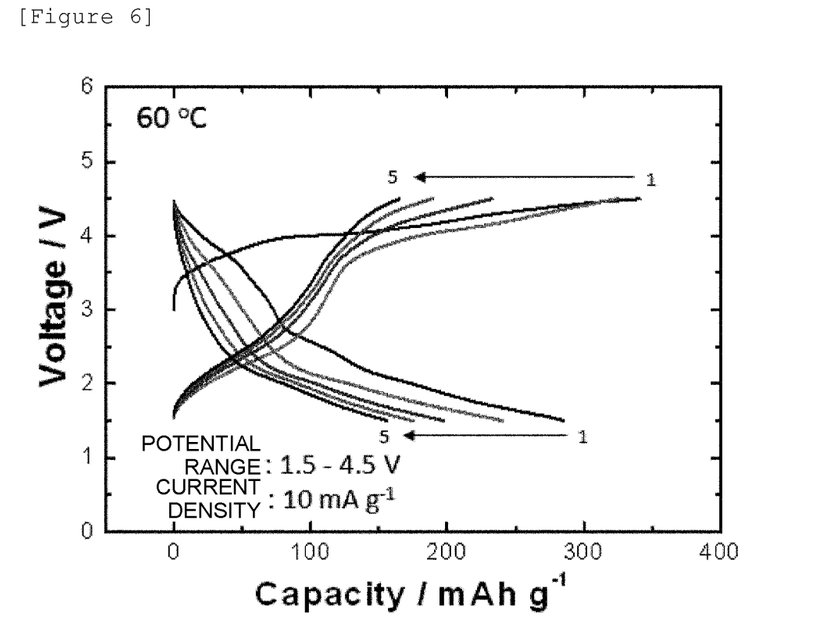
FIG. 6 is a chart showing charge/discharge curves in a charge/discharge test of an electrochemical cell prepared using the complex oxide in Example 3 as a positive electrode active material.

Subsequently, an electrochemical cell with a counter electrode of Li foil was prepared for evaluation. Using 1 M-$LiPF_6$ dissolved in EC/DMC (volume ratio of 1:1) as an electrolytic solution, a charge/discharge test was performed at a current density of 10 mA/g. The charge/discharge test was performed at a temperature of 60° C., in the range of 1.5 to 4.5 V. The results are shown in FIG. 6. It is shown that the charging capacity was higher than the theoretical capacity of $Ni^{2+}/Ni^{4+}$ (151 mAh/g) even after 5 cycles.

Example 4: $Li_{26/40}Ni_{5/40}Mn_{5/40}Mo_{4/40}O$ (Synthesis)

<No. 1: 3 wt % Excess of Li>

In 60 mL of ion-exchanged water, 0.64 g of $LiOH.H_2O$ (3% excess in weight) was dissolved to prepare an aqueous solution of lithium hydroxide with a concentration of 0.2544 mol/L. Subsequently, 0.3252 g of molybdenum oxide ($MoO_3$) powder was added to the aqueous solution of lithium hydroxide, and 0.3490 g of manganese carbonate ($MnCO_3$) powder and 0.3664 g of basic nickel carbonate were further added thereto, to prepare a suspension with an excess of Li of 3% in weight ratio relative to the molar ratio of Li:Ni:Mn:Mo=26:5:5:4. The suspension was stirred with a hot stirrer, and the moisture was then evaporated.

The resulting sample was powdered in a mortar, and the powder was molded into a pellet, which was then fired by being raised to 1050° C. and held threat for 2 hours in a small furnace under air flow.

<No. 2: 10 wt % Excess of Li>

In 60 mL of ion-exchanged water, 0.6840 g of $LiOH.H_2O$ (10% excess in weight) was dissolved to prepare 60 mL of an aqueous solution of lithium hydroxide with a concentration of 0.2717 mol/L. Subsequently, 0.3252 g of molybdenum oxide ($MoO_3$) powder was added to the aqueous solution of lithium hydroxide, and 0.3490 g of manganese carbonate ($MnCO_3$) powder and 0.3664 g of basic nickel carbonate were further added thereto, to prepare a suspension with an excess of Li of 10% in weight ratio relative to the molar ratio of Li:Ni:Mn:Mo=26:5:5:4. The suspension was stirred with a hot stirrer, and the moisture was then evaporated.

The resulting sample was powdered in a mortar, and the powder was molded into a pellet, which was then fired by being raised to 1050° C. and held threat for 2 hours in a small furnace under air flow.

(Composition)

Each content of the elements in the resulting complex oxides of No. 1 and No. 2 was determined by ICP-MS (SPQ-9100 manufactured by SII Nano Technology Inc.), and it was confirmed that both of the complex oxides have a composition (x, y, z)=($26/40$, $10/40$, $4/40$). Further, the average valence of molybdenum was confirmed to be 6 in both of the complex oxides by the X-ray photoelectron spectroscopy measurement.

(Crystal Structure)

Figure 12:
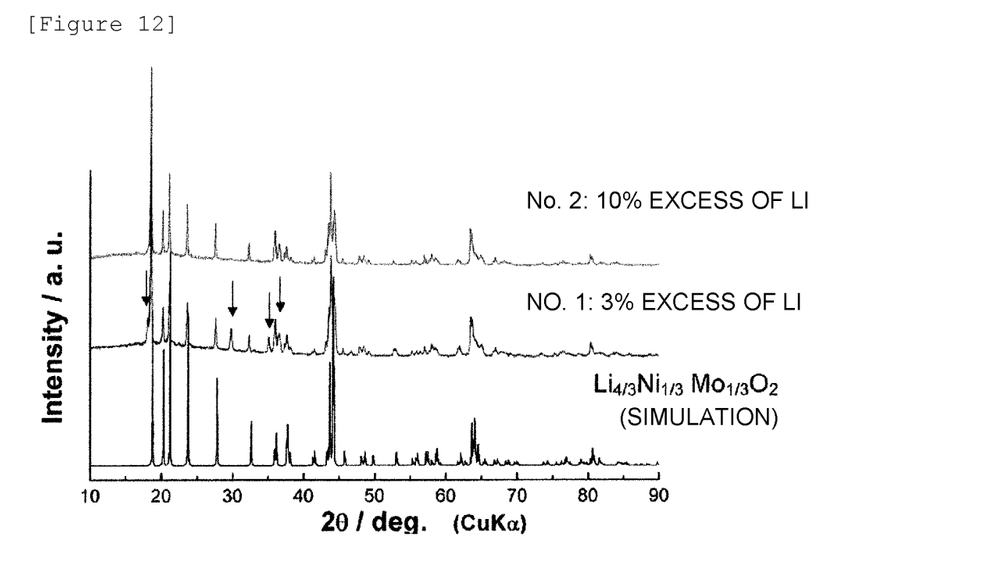
FIG. 12 is a comparative chart of the XRD spectra of the complex oxide in Example 4 ($Li_{26/40}Ni_{5/40}Mn_{5/40}Mo_{4/40}O$) and $Li_{4/3}Ni_{1/3}Mo_{1/3}O_2$ (Simulation).

Using an X-ray diffractometer (MultiFlex, manufactured by Rigaku Corporation) (CuKα radiation), each XRD spectrum of the resulting complex oxides of No. 1 and No. 2 was analyzed under the conditions with an output of 40 kV at 20 mA, a scanning speed of 8°/min, and a sampling width of 0.02°. The results are shown in FIG. 12. In addition, the XRD spectrum of $Li_5ReO_6$-type $Li_{4/3}Ni_{1/3}Mo_{1/3}O_2$ (simulation) cited from T. Betz and R. Hoppe, Z. Anorg. Allg. Chem., 1984, 512, 19. is also shown in FIG. 12. It is believed that the complex oxides have a crystal structure of $Li_5ReO_6$, with $Re^{7+}$ sites substituted with $Mo^{6+}$ and $Li^+$ sites substituted with Ni. Accordingly, it can also be said that the complex oxides have a rock-salt structure with ordering of a part of the cations. Further, Mn may substitute for both of the $Li^+$ sites and the $Re^{7+}$ sites.

(Battery Evaluation)

The positive electrode active material (the complex oxide synthesized as described above) of No. 2 and acetylene black (manufactured by Wako Pure Chemical Industries, Ltd.) were weighed at a mass ratio of 80:20, and mixed for 12 hours in a dry ball mill (200 rpm). Subsequently, the mixture of the positive electrode active material and acetylene black described above was added to a binder (PVDF resin, manufactured by Polysciences, Inc.) dissolved in an organic solvent (N-methylpyrrolidone), at a mass ratio of (positive electrode active material):(acetylene black):(binder)=72:18:10, to make a slurry. The slurry was applied onto an Al foil, dried, and then pressed to make a positive electrode.

Figure 13:
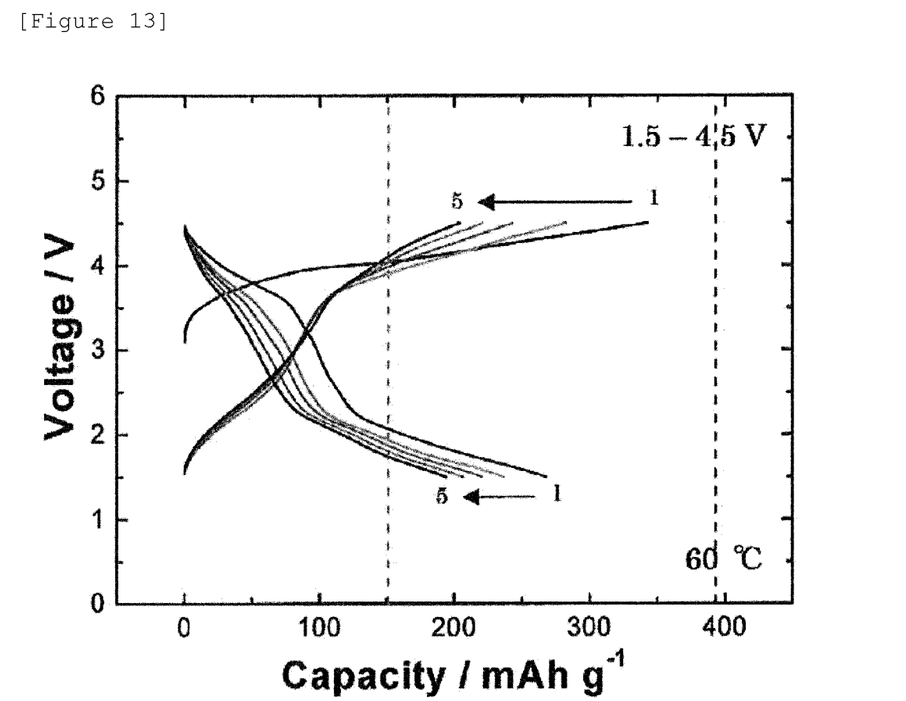
FIG. 13 is a chart showing charge/discharge curves in a charge/discharge test of an electrochemical cell prepared using the complex oxide in Example 4 as a positive electrode active material.

Subsequently, an electrochemical cell with a counter electrode of Li foil was prepared for evaluation. Using 1 M-$LiPF_6$ dissolved in EC/DMC (volume ratio of 1:1) as an electrolytic solution, a charge/discharge test was performed at a current density of 10 mA/g. The charge/discharge test was performed at a temperature of 60° C., in the range of 1.5 to 4.5 V. The results are shown in FIG. 13. It is shown that the charging capacity was higher than the theoretical capacity of $Ni^{2+}/Ni^{4+}$ (151 mAh/g) even after 5 cycles.

The invention claimed is:

1. A complex oxide represented by the following compositional formula:

$$Li_xM_yMo_zO$$

wherein M is one or two or more selected from the group consisting of Mn, Ru, Sn, Mg, Al, Ti, V, Cr, Fe, Co, Ni, Cu, and Zn, and x is in the range of 0.60 to 0.75, y is in the range of 0.15 to 0.25, z is in the range of 0.075 to 0.20, and an average valence of Mo is 5.7 to 6.0, wherein the complex oxide has a $Li_5ReO_6$-type crystal structure with Re sites substituted with Mo or M, and with a part of Li sites substituted with M.

2. The complex oxide according to claim 1, satisfying: x+y+z=0.95 to 1.05.

3. The complex oxide according to claim 1, wherein M is one or two or more selected from the group consisting of Ni, Mn, Fe, and Co.

4. A positive electrode for a nonaqueous electrolyte secondary battery, comprising the complex oxide according to claim 1 as a positive electrode active material.

5. A non-aqueous electrolyte secondary battery comprising the positive electrode according to claim 4.

6. A complex oxide represented by the following compositional formula:

$$Li_xM_yMo_zO$$

wherein M is one or two or more selected from the group consisting of Mn, Ru, Sn, Mg, Al, Ti, V, Cr, Fe, Co, Ni, Cu, and Zn, and x is in the range of 0.60 to 0.75, y is in the range of 0.15 to 0.25, z is in the range of 0.075 to 0.20, and an average valence of Mo is 5.7 to 6.0, wherein the complex oxide has a $Li_4MoO_5$-type crystal structure with a part of Mo sites substituted with M, and with a part of Li sites substituted with M.

7. The complex oxide according to claim 6, satisfying: x+y+z=0.95 to 1.05.

8. The complex oxide according to claim 6, wherein M is one or two or more selected from the group consisting of Ni, Mn, Fe, and Co.

9. A positive electrode for a nonaqueous electrolyte secondary battery, comprising the complex oxide according to claim 6 as a positive electrode active material.

10. A non-aqueous electrolyte secondary battery comprising the positive electrode according to claim 9.

11. A complex oxide represented by the following compositional formula:

$$Li_xM_yMo_zO$$

wherein M is one or two or more selected from the group consisting of Mn, Ru, Sn, Mg, Al, Ti, V, Cr, Fe, Co, Ni, Cu, and Zn, and x is in the range of 0.60 to 0.75, y is in the range of 0.15 to 0.25, z is in the range of 0.075 to 0.20, and an average valence of Mo is 5.7 to 6.0, wherein the complex oxide has a $Li_2MnO_3$-type crystal structure with Mn sites substituted with Mo or M, and with a part of Li sites substituted with M.

12. The complex oxide according to claim 11, satisfying: x+y+z=0.95 to 1.05.

13. The complex oxide according to claim 11, wherein M is one or two or more selected from the group consisting of Ni, Mn, Fe, and Co.

14. A positive electrode for a nonaqueous electrolyte secondary battery, comprising the complex oxide according to claim 11 as a positive electrode active material.

15. A non-aqueous electrolyte secondary battery comprising the positive electrode according to claim 14.

* * * * *